United States Patent
Reddy et al.

(10) Patent No.: US 8,326,078 B2
(45) Date of Patent: Dec. 4, 2012

(54) SYSTEM AND METHOD FOR REMOVING ARTIFACTS FROM A DIGITIZED DOCUMENT

(75) Inventors: Prakash Reddy, Fremont, CA (US); Jian Fan, San Jose, CA (US); Steven T. Rosenberg, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 983 days.

(21) Appl. No.: 12/360,807

(22) Filed: Jan. 27, 2009

(65) Prior Publication Data

US 2010/0189345 A1    Jul. 29, 2010

(51) Int. Cl.
 *G06K 9/40* (2006.01)
 *G06K 9/36* (2006.01)
(52) U.S. Cl. .......................... 382/275; 382/256; 382/282
(58) Field of Classification Search ........................ None
 See application file for complete search history.

(56) References Cited

U.S. PATENT DOCUMENTS

| | | | | |
|---|---|---|---|---|
| 5,781,198 A * | 7/1998 | Korn | ............................ | 345/634 |
| 5,974,199 A * | 10/1999 | Lee et al. | ...................... | 382/289 |
| 6,430,320 B1 * | 8/2002 | Jia et al. | ......................... | 382/289 |
| 6,757,081 B1 * | 6/2004 | Fan et al. | ...................... | 358/474 |
| 6,956,587 B1 * | 10/2005 | Anson | .......................... | 345/649 |
| 2001/0014183 A1 * | 8/2001 | Sansom-Wai et al. | ........ | 382/289 |
| 2006/0098243 A1 * | 5/2006 | Ahmed et al. | ................ | 358/474 |
| 2007/0003157 A1 * | 1/2007 | Eschbach et al. | ............. | 382/275 |
| 2007/0253031 A1 * | 11/2007 | Fan | .............................. | 358/3.27 |
| 2008/0232691 A1 * | 9/2008 | Gkikas et al. | ................. | 382/190 |
| 2009/0040569 A1 * | 2/2009 | Hamzy | .......................... | 358/488 |
| 2009/0252437 A1 * | 10/2009 | Li et al. | ......................... | 382/289 |

OTHER PUBLICATIONS

Jian Fan, Xiaofan Lin, Steven Simske, "A comprehensive image processing suite for book re-mastering", ICDAR05, p. 447-451, Aug. 2005.
HP co-pending disclosures: filed: Jun. 22, 2009; U.S. Appl. No. 12/489,232; Title: System and Method for Adding New Content to a Digitized Document.
HP co-pending disclosures: filed: Jul. 1, 2008; U.S. Appl. No. 12/243,793; Title: Image Enhancement Method and Apparatus.
HP Published disclosure: entitled "Page Content Detection for The Purposes of Achieving Accurate Cropping"; Published Nov. 2008 in Research Disclose.

* cited by examiner

*Primary Examiner* — Li Liu

(57) ABSTRACT

A system and method is disclosed for removing artifacts from a digitized document. The method discloses receiving a digitized document, having an image format, and including content and an artifact; identifying a content boundary within the digitized document; enhancing the digitized document after identifying the content boundary; and removing the artifact by cropping the digitized document to the content boundary after enhancing the digitized document The system discloses a processor configured to operate a series of functional modules, including: a means for receiving a digitized document, having an image format, and including content and an artifact; a content boundary identification module, for identifying a content boundary within the digitized document; an image enhancement module, for enhancing the digitized document after identifying the content boundary; and a content cropping module, for removing the artifact by cropping the digitized document to the content boundary after enhancing the digitized document.

13 Claims, 7 Drawing Sheets

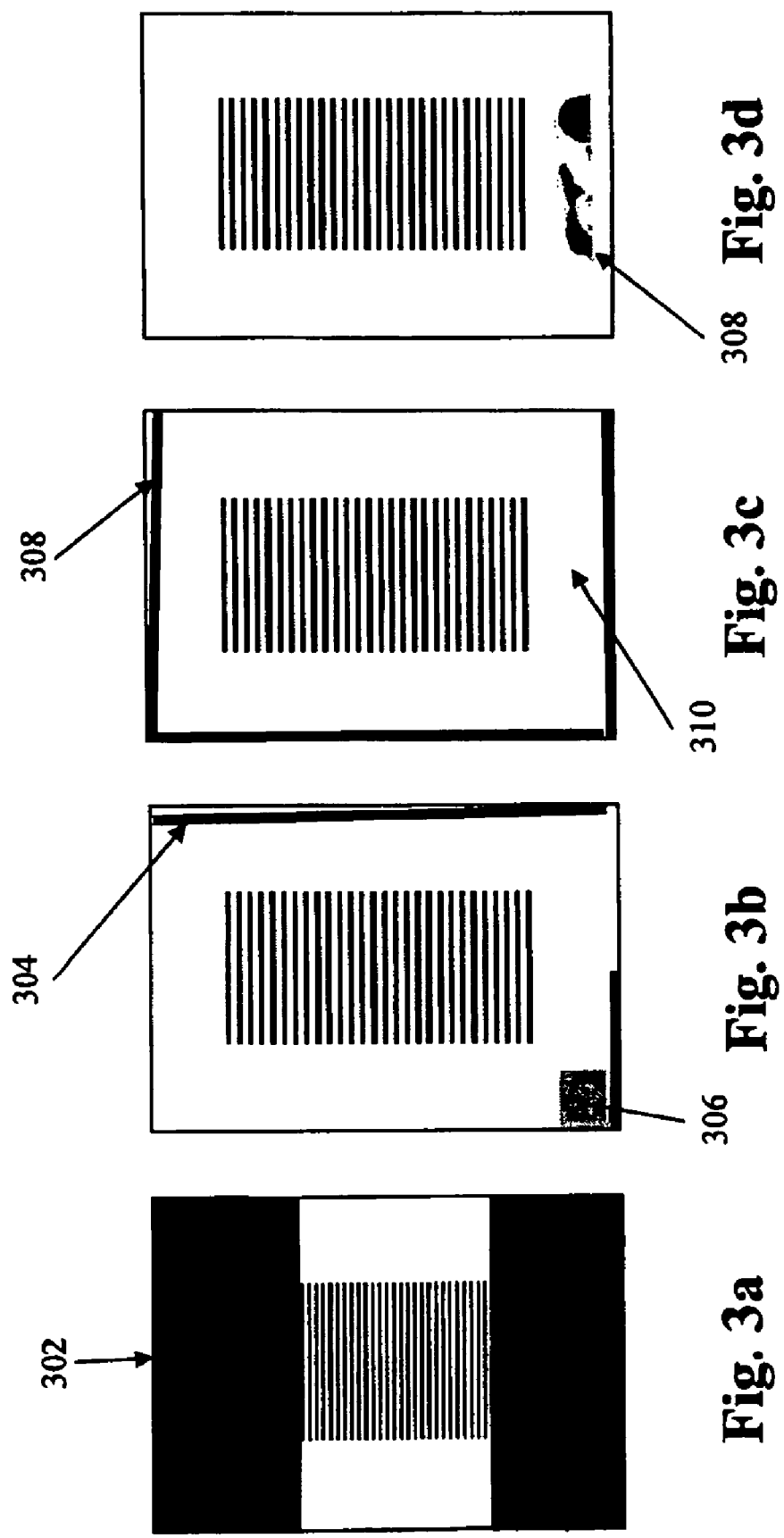

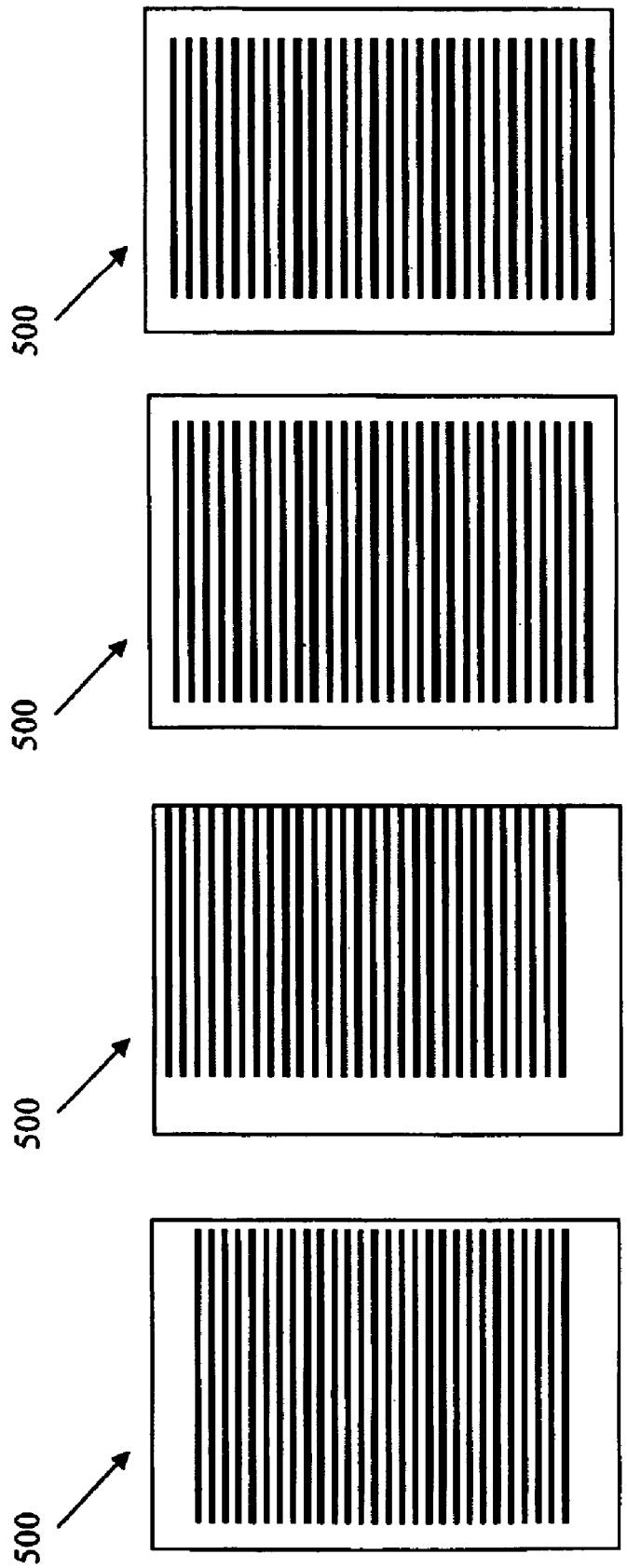

SYSTEM AND METHOD FOR REMOVING ARTIFACTS FROM A DIGITIZED DOCUMENT

BACKGROUND OF THE INVENTION

The present invention relates generally to systems and methods for reprinting digitized documents, and more particularly to the removal of artifacts from such documents.

Digital content creation and conversion is a significant activity in modern times. Not only are existing digital files and documents being created and saved, but new digital information is being created from other non-digital information mediums, including contemporary and historic book and magazine collections previously stored in libraries, vaults, etc., but also photos and other images, herein generally labeled as "documents".

A common technique for digitizing such documents is to scan them using scanners or digital cameras. Regardless of how such items are scanned the process almost always introduces and/or reveals some artifacts.

The kind of artifacts introduced can vary widely. In addition the original documents may have artifacts due to age or how they were handled. Some of the common artifacts introduced during the scanning process include: shadows, gutter lines, including portions of adjacent pages, and page stack shadow.

In order to produce legible and clean copies, artifacts introduced during the scanning process need to be removed. If some of the artifacts present in the original document, perhaps due to aging and handling, could also be removed as well, the resultant digital version of the document would be that much more legible.

Most present implementations strive to identify the artifacts and remove them one by one. It is not always possible however to identify all of these artifacts. This leads to document pages that are not properly cleaned such that some of the artifact residue still remains.

In response to the concerns discussed above, what is needed is a system and method for artifact removal that overcomes the problems of the prior art.

BRIEF DESCRIPTION OF THE DRAWINGS

Some embodiments of the invention are described, by way of example, with respect to the following figures:

FIGS. 3, 4 and 5 are pictorial diagrams of one example of how the system for removing artifacts from a digitized document can be effected;

DETAILED DESCRIPTION OF THE PREFERRED EMBODIMENT

The present invention describes a system and method for removing artifacts from the margins of digitized documents using a specific set of algorithms in a particular order so as to achieve an optimal result. The present invention effects this using content cropping to eliminate artifacts existing outside a content boundary of a document. This replaces techniques such as those that try to identify and remove such artifacts one by one. Content cropping also removes residue left on the margins of a document during color correction, resulting in a substantially cleaned up margin area.

Use of the present invention greatly enhances the quality of derivative works later generated from such digitized content. To effectively do this, content cropping must occur at the right stage of processing, so that information contained in the cropped segments can be used in image enhancement. Failure to perform content cropping at the right time may often introduce and/or reveal new artifacts which would degrade future reprints.

The present invention also benefits from some of the following secondary considerations which may be related to the invention's commercial success, long felt but unsolved needs, failure of others, etc. For instance, when reprinting of digitized books initially started the reject rate for the books was on the order of 90%. Almost all of the rejections were due to the fact that artifacts (a.k.a. noise) on the margins of digitized books were not cleaned up. Some additional artifacts were also introduced and/or revealed when image enhancement algorithms were applied to the digitized books in order to get rid of the age effects present upon an old book's pages. However, once the present invention's technique of using the content boundary to either mask the area outside the content boundary or to crop to the content boundary and position it onto a clean page was invented, the reject rate went down to less than 5%. Thus books scans processed using the present invention have substantially improved the accept rate of reprints from digitized books. Digitized books processed by others have failed to properly clean up such artifacts/noise around the edges.

A "document" is herein defined to include any tangible medium of expression, including books, magazines, photos, video, or any other medium capable of being digitized. Note that while the invention will be discussed primarily with reference to a document which is a book, the teachings of the present invention also apply to the other document types. Also, while the present invention discusses "removing" artifacts, other equivalent measures such as "masking" artifacts can work equally well.

Figure 1:
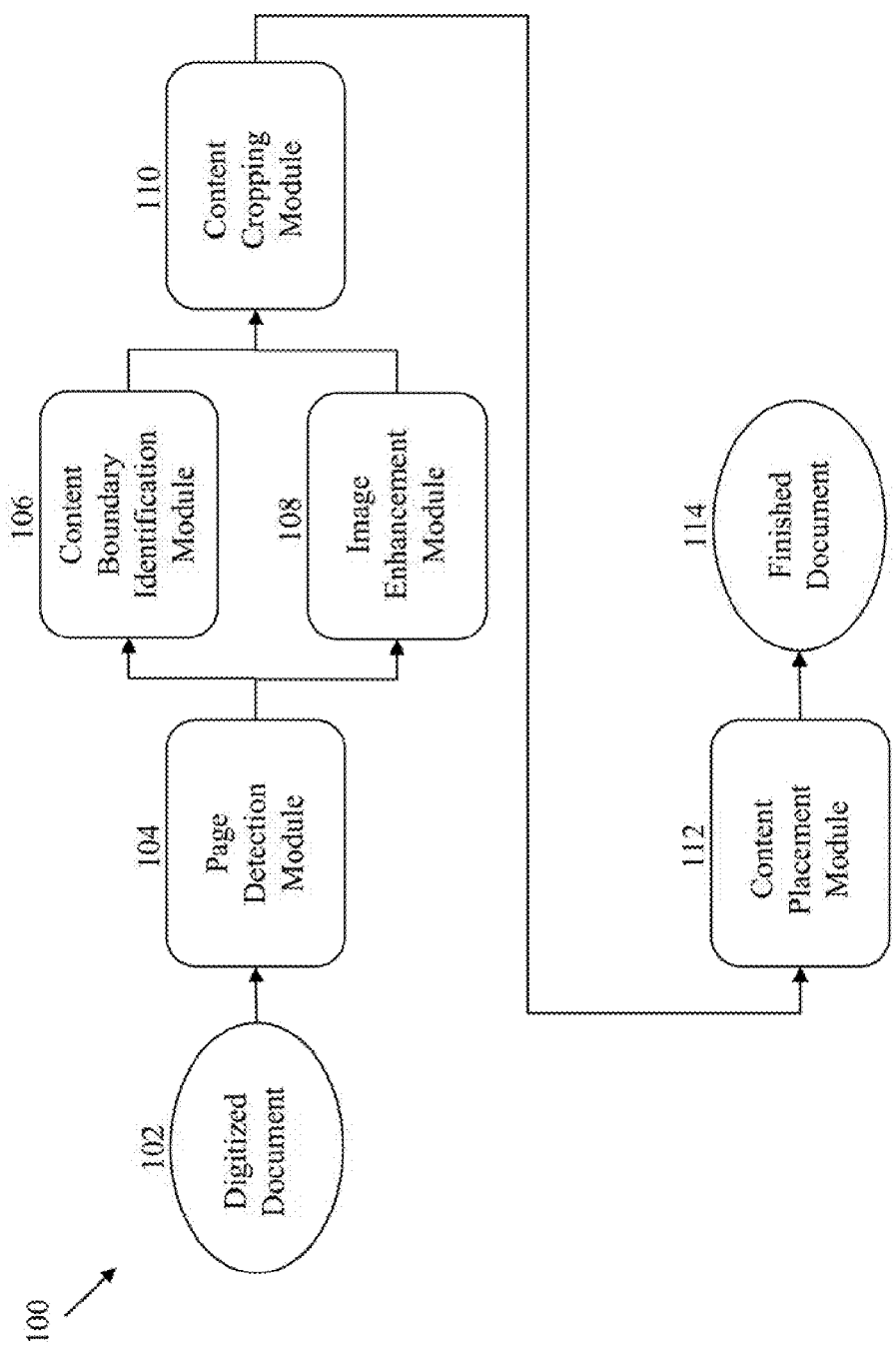
FIG. 1 is one embodiment of a system for removing artifacts from a digitized document.

FIG. 1 is one embodiment of a system 100 for removing artifacts from a digitized document 102. The system 100 includes a page detection module 104, a content boundary identification module 106, an image enhancement module 108, a content cropping module 110, and a content placement module 112. FIG. 2 is a pictorial diagram 200 of one embodiment of how the system 100 for removing artifacts from a digitized document is effected. These two figures are now discussed together.

The page detection module 104 receives a digitized document 102 from a source such as a storage device, a scanner, a digital camera, or other hardware (see FIG. 2a) containing an artifact 201 (a.k.a. noise) to be removed or masked. The digitized document is wholly or partially formatted as an image file. Image files include either pixel or vector (geometric) data that are rasterized to pixels when displayed. Raster formats include: JPEG, TIFF, RAW, PNG, GIF, BMP, PPM, PGM, PBM, XBM, ILBM, WBMP, and PNM. Vector formats include: CGM, and SVG.

The image format as defined herein, does not in itself (i.e. by its format coding) separately give meaning to different portions of the digitized document 102. For example, the image format would represent any text within the digitized document 102 using a same set of format rules (e.g. perhaps by assigning a gray-scale, brightness, and/or color code to each pixel in the digitized document 102) as any other portion of the digitized document 102 such as a margin region.

The page detection module 104 uses known techniques to distinguish a digitized document page 202 from extraneous information 204 such as the device or surface from which the page was scanned (e.g. a scanner's glass plate, or the surface of a desk from which a photo of the page was captured). Next, the page detection module 104 crops out the extraneous information 204 from the digitized document 102 and preserves just the digitized document page 202. In an alternate embodiment, the digitized document 102 has already been cropped to the digitized document page 202, eliminating the need for the page detection module 104.

The content boundary identification module 106 receives the digitized document page 202 from the page detection module 104 and identifies a content boundary 206, (see FIG. 2*b*) as shown by the dashed line. The content boundary identification module 106 also uses known techniques to distinguish the content boundary 206 from a margin region 208 typically surrounding content within the content boundary 206. Such techniques preferably automatically compute the content boundary 206; however, the content boundary 206 could be identified manually as well.

Content is herein defined as including that portion of the digitized document page 202 which contains information which the system 100 has been tuned to identify as essential for a derivative work later to be generated from digitized document page 202. In one embodiment, such content includes typed text on the page of a book. In another embodiment, such content includes typed text plus margin notes scribbled by a prior reader of the book. Thus what constitutes the content can vary from digitized document to digitized document. In other embodiments, the content includes: illustrations, pictures, and/or photos.

The content boundary 206 is typically in the shape of a rectangular region around the content in a given digitized document page 202. Those skilled in the art, however, will recognize that the content boundary 206 could also be of a different preferred shape, depending upon the content to be used for the later derivative work.

Preferably the content boundary 206 is identified using as much of the information that was originally captured in the digitized document page 202, while it is still available. Identifying the content boundary 206 before the digitized document page's 202 background color is removed and/or overall image is enhanced enables the content to be detected more effectively. This is in part because automated methods for detecting the content boundary 206 often use background color information as well as other information otherwise lost due to image enhancement to distinguish content from the margin region 208.

Next, the image enhancement module 108 receives digitized document page 202, including the margin region 208. The image enhancement module 108 uses the margin region 208 or other blank space on the digitized document page 202 to compute an original background color of the digitized document page 202. Next, the image enhancement module 108 compares the determined original background color to other color information in the digitized document page 202 to distinguish the original background from other non-background information in the digitized document page 202. It is preferred that the original background color is determined from the digitized document page 202 before the margin region 208 is cropped to the content boundary 206 of the digitized document page 202 so that the original background color may be more accurately computed. The image enhancement module 108 then removes the original background color from the digitized document page 202. In alternate embodiments, the original background color can be replaced with a new background color, or masked in some other way. Next the image enhancement module 108 sharpens and performs other enhancements to the other non-background information in the digitized document page 202, thereby creating an enhanced document page. This other non-background information include the content of the digitized document page 202 within the content boundary 206. This other non-background information also includes the artifact 201 and any other artifacts that may appear (e.g. perhaps hidden by the background color) during the image enhancement module's 108 sharpening and enhancing operations. For example, before enhancement there could be a shadow or edge line which is close to the original background color of the page. When the original background color is removed from the digitized document page 202, the line and/o shadow is turned black in color and appears as an artifact. The sharpening and enhancing operations as well as the background color determination are effected using known techniques.

Note that the operations of the content boundary identification module 106 and the image enhancement module 108 may be effected in parallel using duplicate copies of the digitized document page 202 so as to save processing time in some embodiments of the present invention.

Figure 2D:
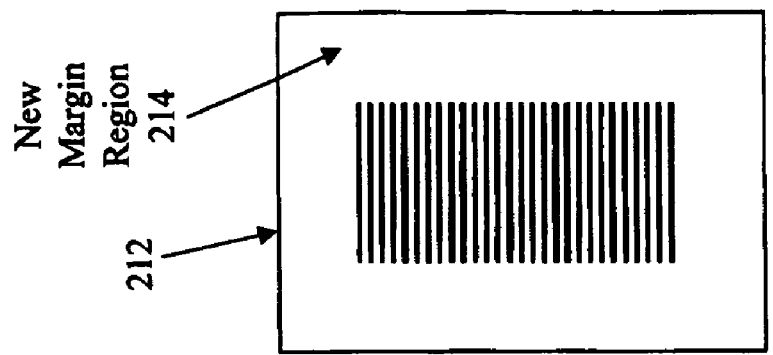
FIG. 2 is a pictorial diagram of one embodiment of how the system for removing artifacts from a digitized document is effected.
Figure 2C:
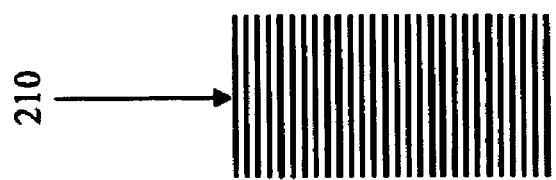
Figure 2B:
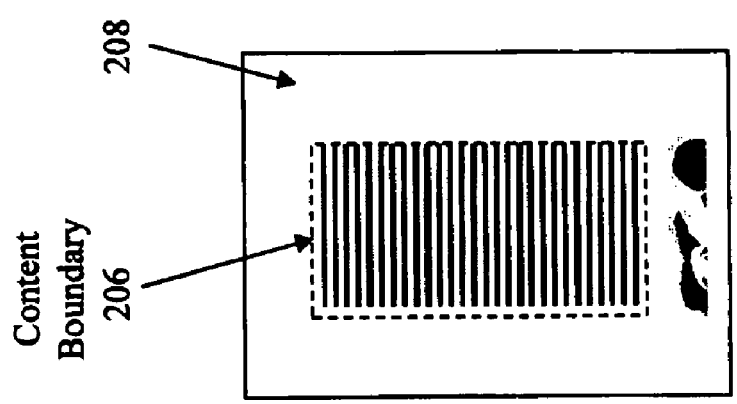
Figure 2A:
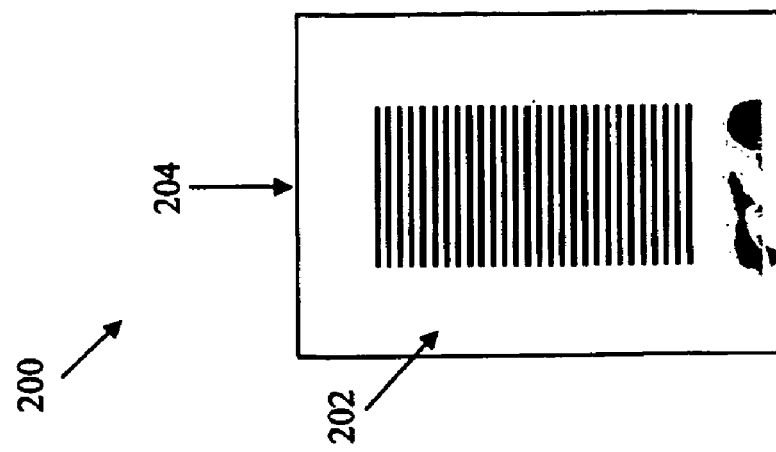
Figure 4A:
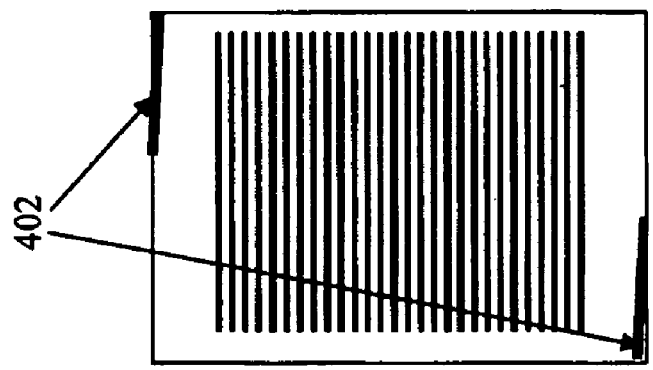
Figure 4B:
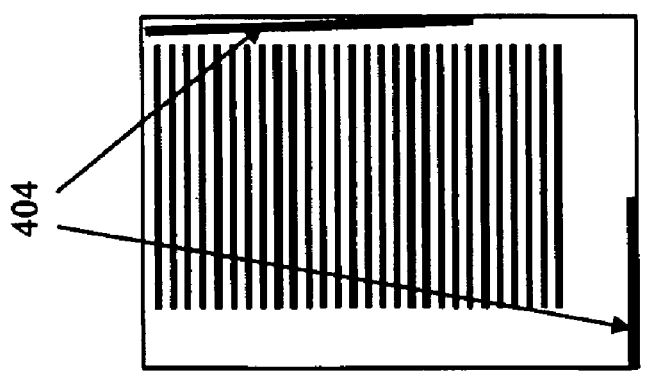
Figure 4C:
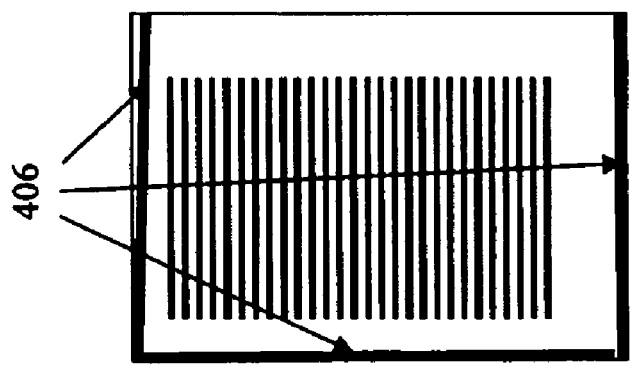
Figure 4D:
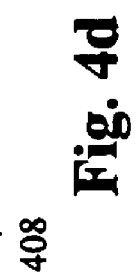
Figure 6D:
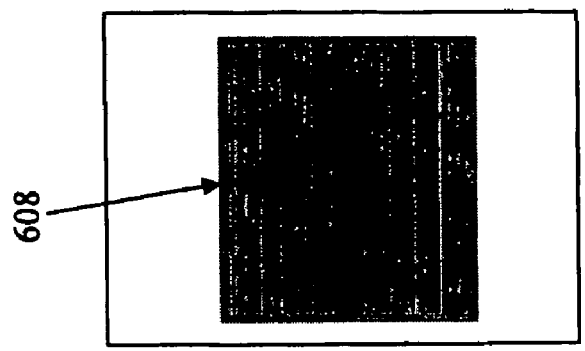
FIG. 6 is a pictorial diagram a few problems that can result if image enhancement is performed after cropping.
Figure 6C:
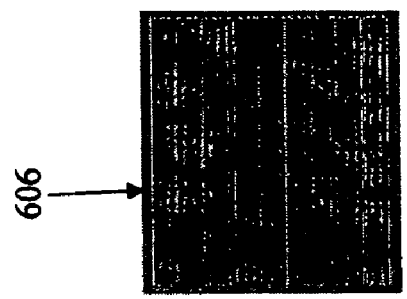
Figure 6B:
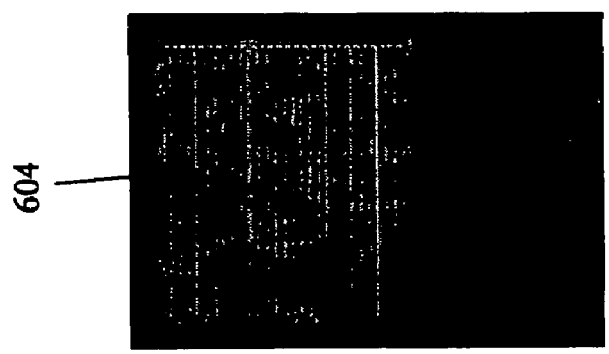
Figure 6A:
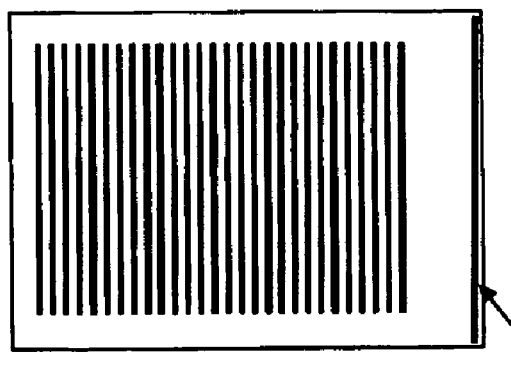

The content cropping module 110 receives the enhanced document page (not shown) which has had the background color removed, its text (if any) sharpened, and other enhancements performed. The content cropping module 110 then removes the margin region 208 from the enhanced document page using the content boundary 206 computed by the content boundary identification module 106. The result is a cropped document page 210, as shown in FIG. 2*c*. Note that the cropped document page 210 has eliminated the artifact 201 and any other artifacts that may have appeared and/or been introduced into the margin region 208 during the image enhancement module's 108 sharpening and enhancing operations. The cropped document page 210 is thus a culmination of the functionality discussed above, and forms a foundation for later derivative works to be created that have substantially, if not completely, no artifacts (i.e. noise) introduced by the digitized document page 202 outside of the content boundary 206.

In one embodiment of the present invention, the content placement module 112 takes the cropped document page 210 and generates a finished document 114, which is a derivative work of the cropped document page 210. FIG. 2*d* shows a cleaned document page 212, corresponding to the finished document 114. The content placement module 112 preferably surrounds the cropped document page 210 with a new margin region 214 which makes the cropped document page 210 appear centered within the cleaned document page 212. The new margin region 214 preferably has a same color as the new background color of the content within the content boundary 206. The new background color was generated by the image enhancement module 108, as discussed above.

In a preferred embodiment, the system 100 removes artifacts from digitized documents in the specific order discussed above. Those skilled in the art however will know that other embodiments of the system 100 may effect all or a portion of the steps discussed in a different order, and yet still remove most or all artifacts from a digitized document.

FIGS. 3, 4, and 5, in combination, illustrate a few ways in which the present invention may operate to remove most or all artifacts from digitized documents.

To begin, in FIG. 3, are some typical scanning artifacts, including: a black background 302, and a back cover showing through in FIG. 3a; an edge line on right 304 and tab 306 on bottom left in FIG. 3b; edge lines around the edge, and bleed through 310 in margin in FIG. 3c; and an image of a finger 312 holding the paper during scanning in FIG. 3d. These and other artifacts (i.e. noise) can be introduced during the scan process, or present in the documents due to age, handling, etc. such as color fade and dulling of the text.

FIG. 4 shows examples of enhanced document pages before the content cropping module 110 crops to the content boundary 206. FIG. 4a shows edge lines 402; FIG. 4b shows a line not cleaned up, as well as an edge line 404; FIG. 4c shows edge lines on three sides 406; and FIG. 4d shows a thumb image 408 not cleaned. As can be seen, in many cases the image enhancement module's 108 operations actually increased the prominence of the artifacts, making them even more visible.

FIG. 5 shows some examples of processed document pages after cropping. All of the artifacts shown in FIGS. 4a through 4d which were outside the content boundary have been removed.

FIG. 6 illustrates a few problems that can result (i.e. artifacts which can remain on the processed document) if the image enhancement module 108 is given a cropped version of the digitized document page 202 instead of the complete digitized document page 202. In FIG. 6a, the image enhancement module 108 has improperly introduced and/or revealed an edge line 602 since the image enhancement module 108 did not have enough margin information to properly compute the background color due to the prior image cropping. In FIGS. 6b, 6c, and 6d show a progression from an original digitized document 602, that was cropped 604 before image enhancement, resulting in the original background color remaining when a new margin is added 606.

Figure 7:
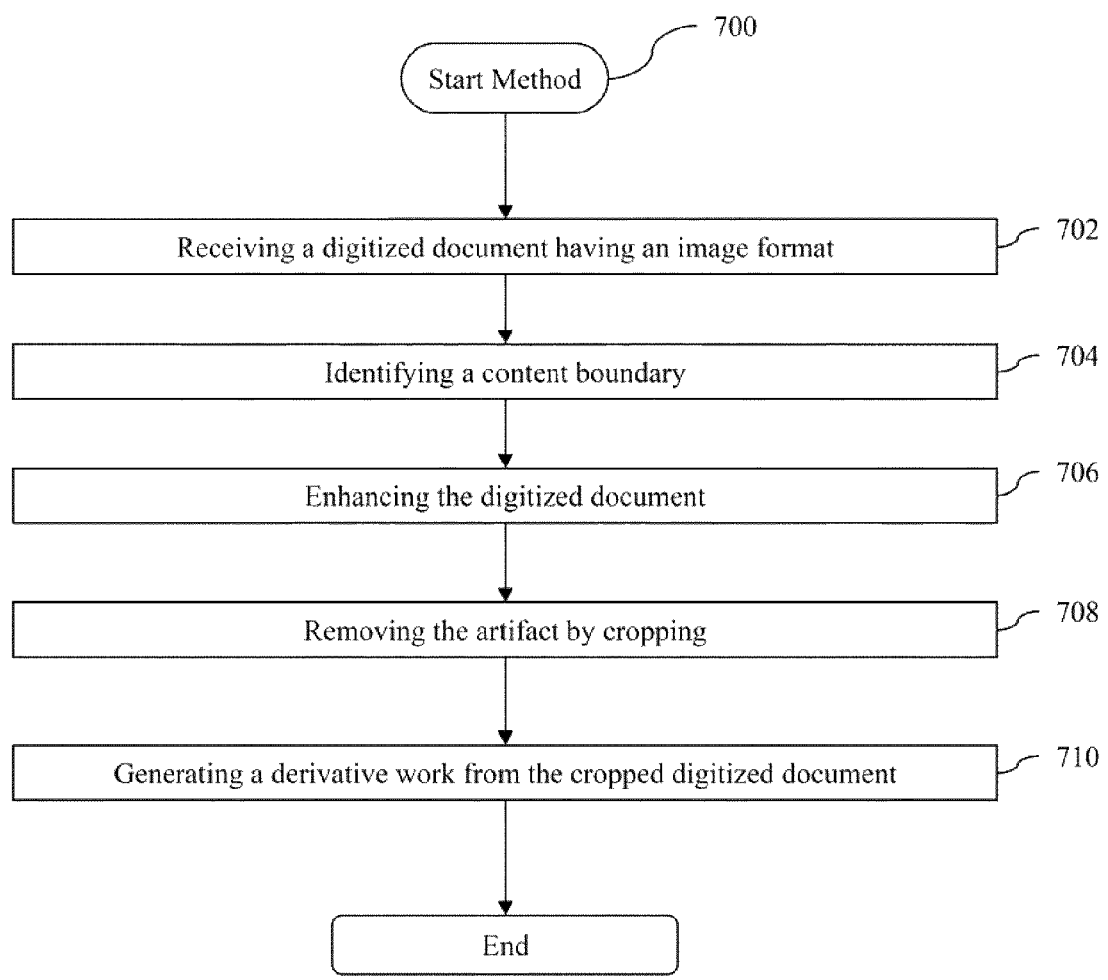
FIG. 7 is a flowchart of one embodiment of a method for removing artifacts from a digitized document.

FIG. 7 is a flowchart of one embodiment of a method 700 for removing artifacts from a digitized document. Those skilled in the art will recognize that while one embodiment of the present invention's method is now discussed, the material in this specification can be combined in a variety of ways to yield other embodiments as well.

The method 700 begins in step 702, by receiving a digitized document in an image format which includes content and an artifact. The image format of the digitized document includes one from a group of: JPEG, TIFF, RAW, PNG, GIF, BMP, PPM, PGM, PBM, XBM, ILBM, WBMP, PNM, CGM, and SVG. The digitized document in various embodiments includes an image of one from a group of: text, a photo, and a frame of video. The artifact is located in a margin region juxtaposed next to a portion of the content boundary and the content can include typed text on a page.

Next, in step 704, a content boundary within the digitized document is identified. Identifying includes using background color from the digitized document to detect the content boundary. The content boundary is typically in a shape of a rectangular region around the content.

Next, in step 706, the digitized document enhanced after identifying the content boundary. Enhancing includes removing background color from the digitized document after identifying the content boundary, and sharpening any text in the digitized document. The enhancing step may also include: removing an original background color from the digitized document; replacing the original background color with a new background color; and/or masking the original background color from the digitized document. Often times enhancing introduces or reveals new artifacts into the digitized document outside of the content boundary; however, these are also removed later during cropping, enhancing includes sharpening the text.

In an alternate embodiment of the present invention, identifying in step 704 includes identifying the content boundary within a first copy of the digitized document, and enhancing in step 706 includes enhancing a second copy of the digitized document. In such an embodiment the identifying and enhancing steps 704 and 706 may be executed in parallel.

Next, in step 708, the artifact is removed by cropping the digitized document to the content boundary after enhancing the digitized document.

Then, in step 710, a derivative work is generated from the cropped digitized document. Generating may include adding a new margin around the cropped digitized document which has a same color as a background color of the cropped digitized document.

Instructions of software described above are loaded for execution on a processor. The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks: other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations thereof. It is intended that the following claims cover such modifications and variations as fall within the true spirit and scope of the invention.

What is claimed is:

1. A method, executed by a computer, for removing artifacts from a digitized document, comprising:
receiving a digitized document, having an image format, and including content and an artifact;
identifying a content boundary within the digitized document;
determining an original background color of the digitized document;
enhancing the digitized document after identifying the content boundary;
removing the artifact by cropping the digitized document to the content boundary after enhancing the digitized document; and
generating a derivative work from the cropped digitized document, including adding a new margin region around the cropped digitized document having a same color as the original background color.

2. The method of claim 1:
the digitized document further comprising a margin region juxtaposed next to a portion of the content boundary;
wherein the artifact is located in the margin region.

3. The method of claim 1:
wherein the image format of the digitized document includes one from a group of: JPEG, TIFF, RAW, PNG, GIF, BMP, PPM, PGM, PBM, XBM, ILBM, WBMP, PNM, CGM, and SVG.

4. The method of claim 1:
wherein identifying includes: using the original background color from the digitized document to detect the content boundary; and
wherein enhancing include: removing the original background color from the digitized document after identifying the content boundary.

5. The method of claim 1:
wherein the content boundary is in a shape of a rectangular region around the content.

6. The method of claim 1:
wherein enhancing includes one from a group of:
removing the original background color from the digitized document;
replacing the original background color with a new background color; and
masking the original background color from the digitized document.

7. The method of claim 1:
wherein identifying includes identifying the content boundary within a first copy of the digitized document; and
wherein enhancing include, enhancing a second copy of the digitized document; and
further comprising executing the identifying and enhancing in parallel.

8. The method of claim 1:
wherein enhancing includes, revealing new artifacts in the digitized document outside of the content boundary.

9. The method of claim 1:
wherein content includes typed text on a page; and
wherein enhancing includes sharpening the text.

10. The method of claim 1:
wherein the digitized document includes an image of one from a group of: text, an illustration, a picture, a photo, and a frame of video.

11. An article comprising at least one non-transitory computer-readable storage medium containing instructions that when executed cause a computer to remove artifacts from a digitized document, by:
receiving a digitized document, having an image format, and including content and an artifact;
identifying a content boundary within the digitized document;
determining an original background color of the digitized document;
enhancing the digitized document after identifying the content boundary;
removing the artifact by cropping the digitized document to the content boundary after enhancing the digitized document; and
generating a derivative work from the cropped digitized document, including adding a new margin region around the cropped digitized document having a same color as the original background color.

12. The at least one non-transitory computer readable storage medium of claim 11:
wherein identifying includes: using the original background color from the digitized document to detect the content boundary; and
wherein enhancing includes: removing the original background color from the digitized document after identifying the content boundary.

13. A system for removing artifacts from a digitized document, comprising:
a processor configured to operate a series of functional modules, including:
a page detection module to receive a digitized document, having an image format, and including content and an artifact;
a content boundary identification module, to identify a content boundary within the digitized document;
an image enhancement module, to determine an original background color of the digitized document, wherein the image enhancement module is to enhance the digitized document after identifying the content boundary;
a content cropping module, to remove the artifact by cropping the digitized document to the content boundary after enhancing the digitized document; and
a content placement module, for generating a derivative work from the cropped digitized document, including adding a new margin region around the cropped digitized document that has a same color as the original background color.

* * * * *